US007801758B2

(12) United States Patent
Gracie et al.

(10) Patent No.: US 7,801,758 B2
(45) Date of Patent: Sep. 21, 2010

(54) SYSTEM AND METHOD FOR CONDUCTING AN OPTIMIZED CUSTOMER IDENTIFICATION PROGRAM

(75) Inventors: Matthew Kenneth Gracie, Alexandria, VA (US); David Benjamin Caruso, South Riding, VA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 239 days.

(21) Appl. No.: 10/735,018

(22) Filed: Dec. 12, 2003

(65) Prior Publication Data

US 2005/0131752 A1 Jun. 16, 2005

(51) Int. Cl.
*G06F 17/30* (2006.01)
(52) U.S. Cl. .......................................... 705/10; 705/38
(58) Field of Classification Search .................. 705/10, 705/38
See application file for complete search history.

(56) References Cited

U.S. PATENT DOCUMENTS

| | | | | |
|---|---|---|---|---|
| 3,946,503 | A * | 3/1976 | Buchan et al. ............... 434/316 |
| 5,572,421 | A * | 11/1996 | Altman et al. .................. 705/3 |
| 5,574,828 | A * | 11/1996 | Hayward et al. .............. 706/45 |
| 5,842,195 | A * | 11/1998 | Peters et al. .................... 707/1 |
| 6,105,007 | A | 8/2000 | Norris |
| 6,171,112 | B1 * | 1/2001 | Clark et al. .................. 434/322 |
| 6,270,456 | B1 * | 8/2001 | Iliff ............................. 600/300 |
| 6,349,290 | B1 | 2/2002 | Horowitz et al. |
| 6,354,490 | B1 | 3/2002 | Weiss et al. |
| 6,589,055 | B2 * | 7/2003 | Osborne et al. ............. 434/219 |
| 6,912,502 | B1 * | 6/2005 | Buddle et al. .................. 705/1 |
| 6,925,443 | B1 * | 8/2005 | Baggett et al. ................ 705/10 |
| 2002/0059093 | A1 * | 5/2002 | Barton et al. ................. 705/10 |
| 2002/0099586 | A1 * | 7/2002 | Bladen et al. .................. 705/7 |
| 2002/0103747 | A1 | 8/2002 | Lawrence |
| 2002/0138371 | A1 | 9/2002 | Lawrence et al. |
| 2002/0138407 | A1 | 9/2002 | Lawrence et al. |
| 2002/0138408 | A1 * | 9/2002 | Lawrence ..................... 705/38 |
| 2002/0138417 | A1 | 9/2002 | Lawrence |
| 2003/0065600 | A1 | 4/2003 | Terashima et al. |
| 2003/0101086 | A1 * | 5/2003 | San Miguel ..................... 705/9 |
| 2003/0101131 | A1 | 5/2003 | Warren et al. |
| 2003/0126049 | A1 * | 7/2003 | Nagan et al. .................. 705/35 |
| 2003/0126469 | A1 | 7/2003 | King et al. |
| 2003/0131011 | A1 | 7/2003 | Haunschild et al. |
| 2003/0140000 | A1 | 7/2003 | Lee |
| 2003/0144950 | A1 | 7/2003 | O'Brien et al. |
| 2004/0123162 | A1 * | 6/2004 | Antell et al. ................. 713/202 |

OTHER PUBLICATIONS

International Search Report, PCT Application No. PCT/US04/41364, dated Dec. 28, 2005, 2 pages.

* cited by examiner

*Primary Examiner*—Johnna Loftis
(74) *Attorney, Agent, or Firm*—Hunton & Williams LLP

(57) ABSTRACT

A computer-implemented method of compiling a customer information set that complies with regulatory criteria is provided. The method comprises providing an overall question set having a plurality of questions and determining from the overall question set a basic question set, the basic question set including at least one basic question. The method further comprises associating an expected answer with at least one question of the basic question set and providing criteria for modifying the basic question set based on receiving an answer that differs from the expected answer. The method still further comprises optimizing an interactive customer survey with a customer using the overall question set, the basic question set, the expected answer and the criteria for modifying the basic question set.

38 Claims, 14 Drawing Sheets

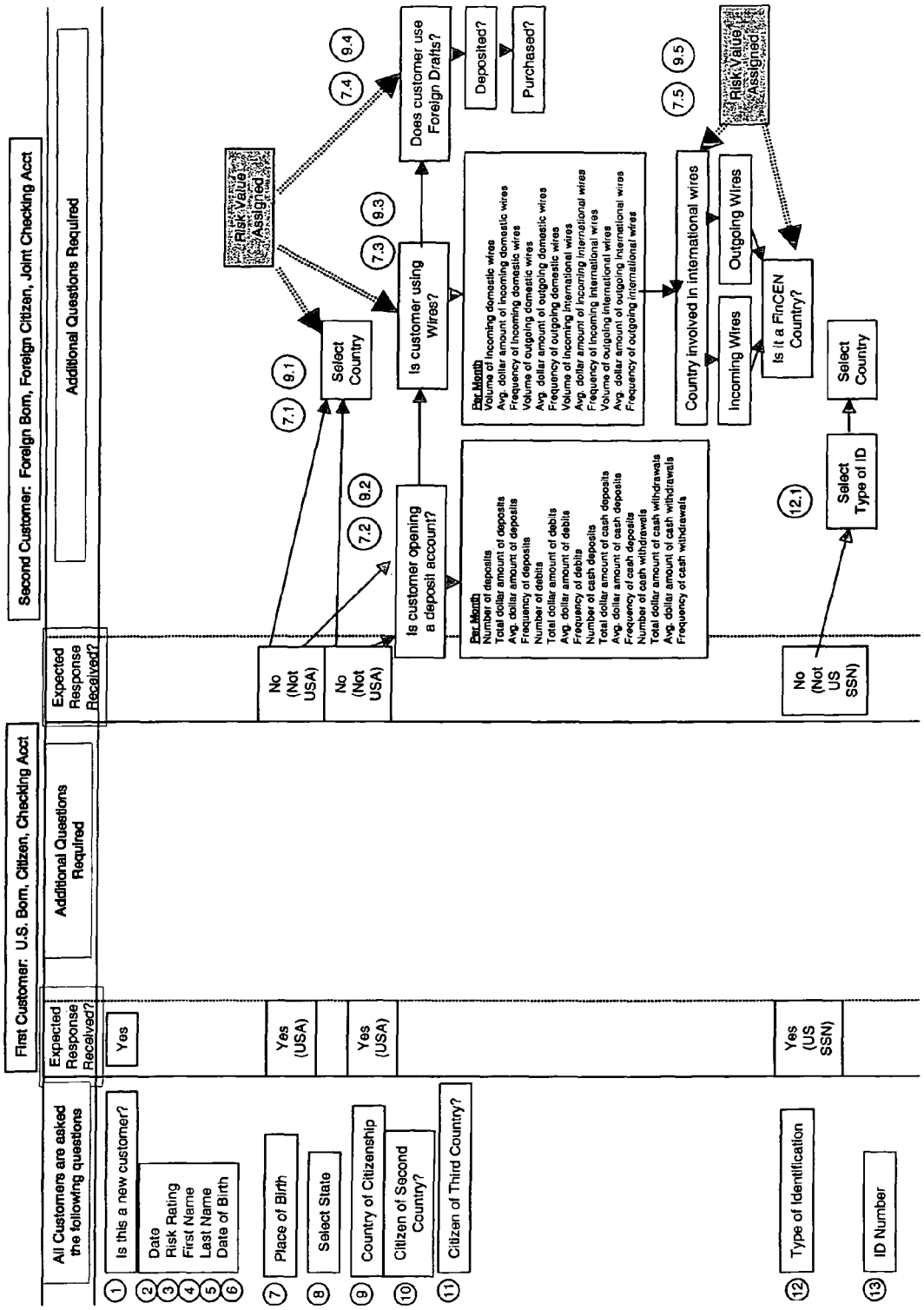
FIG. 2a  COMPARISON OF TWO COMPLIANT QUESTION SESSIONS

FINANCES OF PRIMARY ACCOUNTHOLDER

Estimated Annual Income (All Sources)

Source of Funds (Check all that apply)

- ☐ Salary/Wages
- ☐ Royalties
- ☐ Investments
- ☐ Pension
- ☐ Public Assistance
- ☐ Rental Income
- ☐ Trust
- ☐ Income from a Family Business
- ☐ Other Estimated Net Worth (All Sources)

Sources of Wealth (Check all that apply)

- ☐ Salary/Wages
- ☐ Sale of Real Estate
- ☐ Gift
- ☐ State of Business
- ☐ Sale of Personal Property
- ☐ Sale of Securities
- ☐ Inheritance
- ☐ Bonus
- ☒ Tax Refund
- ☒ Living Trust (Cash)
- ☒ Living Trust (Non-Cash)
- ☒ Investment Management Account
- ☐ Other
- If Other, Explain

If Living Trust (Cash)

- ☐ Personal Bank Accounts
- ☐ Proceeds from Sale of Assets
- ☐ Bonus
- ☐ Tax Refund

If Living Trust (Non-Cash)

- ☐ Securities
- ☐ Real Estate

If Investment Management Account

- ☐ Transfer from Other Client Account
- ☐ Proceeds from Sale of Assets
- ☐ Other

SYSTEM AND METHOD FOR CONDUCTING AN OPTIMIZED CUSTOMER IDENTIFICATION PROGRAM

FIELD OF THE INVENTION

The invention relates generally to business processes involving compliance with government regulation and the risks associated therewith. More particularly, the invention relates to methods that enable financial institutions to gather, assess, and aggregate risks associated with government regulations prior to or simultaneously with the initiation of an account relationship.

BACKGROUND OF THE INVENTION

In the past decade, there has been an increased interest on the part of legislatures and regulators in imposing rules upon financial institutions (i.e., banks, securities dealers, mutual funds, insurance providers and others as defined by the Bank Secrecy Act (USC Title 31)) that require these institutions to better identify, investigate, and report customer and/or transaction activity that is suspicious. Suspicious activities include those involving or relating to theft or fraud. Since the passage of the USA PATRIOT Act in October, 2001, significant emphasis has been placed on a financial institution's capability to detect and report potential money laundering and terrorist financing activity.

The USA PATRIOT Act requires financial institutions to meet certain requirements in order to be compliant with the expectations of regulators. Among these are the requirements that financial institutions must have designated compliance officers focusing on abiding by the regulations set forth in the Bank Secrecy Act; detailed written policies and procedures for internal controls related to anti-money laundering and terrorist financing activity, and comprehensive anti-money laundering and terrorist financing training and education programs. In addition, the law requires financial institutions to design and implement a robust Customer Identification Program ("CIP").

A financial institution's CIP is required to (1) obtain and verify the identity of customers; (2) obtain a physical address of customers; (3) obtain a customer's date of birth; and, (4) obtain an identifying number of a customer such as a Social Security Number of passport number. For non-individual customers such as businesses or organizations, the financial institution is required to have procedures for ensuring the full and proper identity of each business or organization, as well as the identity of the individuals who exercise control over the accounts of the business or organization.

A further requirement of the law is that financial institutions have risk-based procedures to identify, investigate, and report suspicious activity related to potential money laundering and/or terror financing. Regulatory expectations are that financial institutions will have some form of automated information technology system to accomplish this task. The enormity of the task cannot be understated. Many financial institutions have hundreds of thousands or even millions of customers who each day engage in comparable numbers of transactions. Nevertheless, regulatory authorities expect financial institutions to be able to filter these transactions and identify those that need further review to determine if they are suspicious. As a result, there is a growing market for software products capable of sifting and filtering the millions of transactions to find those anomalies potentially related to money laundering or terror financing. Such products are often referred to as "back end" systems, in that they filter information from transactions after they have occurred. In other words, these systems look back on activities occurring over a period of time in order to identify those that are or may be unusual or suspicious.

Back end investigation systems, by definition, cannot assist a financial institution in identifying at the start of a business relationship those individuals and/or organizations that are more likely to be involved in suspicious or unusual activity. Accordingly, there is a need for an efficient "front end" system for gathering information and identifying those relationships that present a higher than normal risk for money laundering or terrorist financing prior to or simultaneous to the opening of an account. Such a system would identify risk, not on past behavior, but on certain personal characteristics and anticipated transaction characteristics that are known to the regulatory and financial industry communities as presenting a higher probability for non compliance with anti-money laundering laws.

SUMMARY OF THE INVENTION

The invention described herein combines the needs of government regulations, business needs (cost/benefit), product requirements (certain products, such as mortgages, have their own regulatory requirements for data collection), and customer expectations (time and ease of account opening experience) and applies the appropriate business logic to assure that the right question is posed to the right person at the right time.

An illustrative embodiment of the invention accomplishes this through a computer-implemented method of compiling a customer information set that complies with regulatory criteria. The illustrative method comprises providing an overall question set having a plurality of questions and determining from the overall question set a basic question set, the basic question set including at least one basic question. The method further comprises associating an expected answer with at least one question of the basic question set and providing criteria for modifying the basic question set based on receiving an answer that differs from the expected answer. The method still further comprises optimizing an interactive customer survey with a customer using the overall question set, the basic question set, the expected answer and the criteria for modifying the basic question set.

BRIEF DESCRIPTION OF THE DRAWINGS

The invention can be more fully understood by reading the following detailed description together with the accompanying drawings, in which like reference indicators are used to designate like elements, and in which:

FIG. 9 is a screen shot of a portion of an exemplary question display screen that may be produced and used in methods of the invention;

FIG. 10 is a screen shot of a portion of the question display screen of FIG. 9 with additional information added;

FIG. 12 is a screen shot of a portion of a modified version of the question display screen portion of FIG. 11; and FIG. 13 is a screen shot of an exemplary question display screen that may be produced and used in methods of the invention.

DETAILED DESCRIPTION OF THE INVENTION

Figure 1:
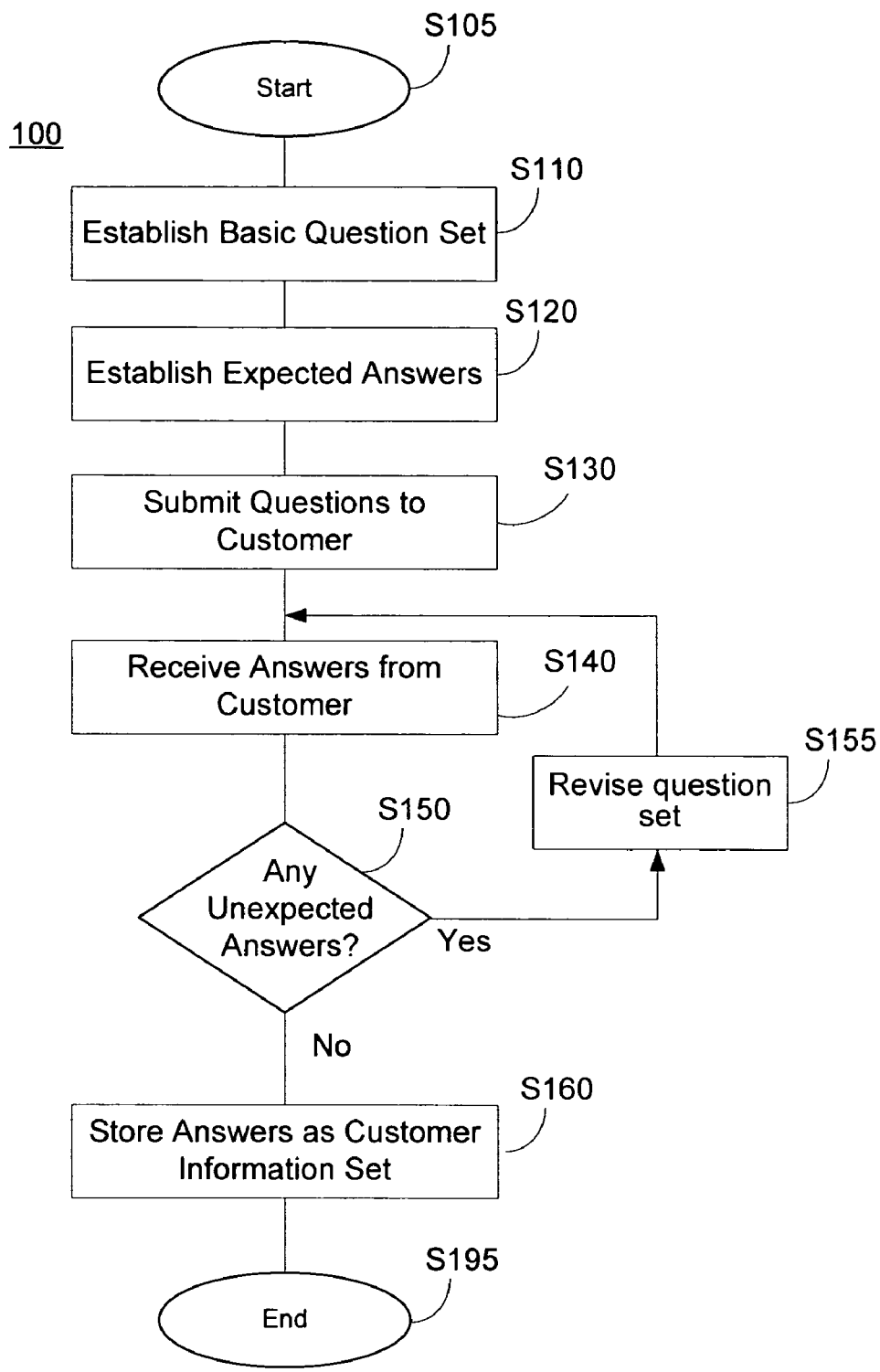
FIG. 1 is a flowchart of a method for compiling a customer information set according to an embodiment of the invention.

Aspects of the systems and methods of various embodiments of the invention will now be described. As used herein, any term in the singular may be interpreted to be in the plural, and alternatively, any term in the plural may be interpreted to be in the singular.

The systems and methods of the invention provide efficient customer service oriented tools for assisting financial institutions and other entities in complying with government regulations. These tools may be used to identify, assess, and quantify the risks associated with establishing an account or other business relationship with a customer at or before the initiation of that relationship. The systems and methods of the invention accomplish this through the use of an optimized customer information survey methodology that provides the customer information needed to meet the requirements of regulatory agencies, requirements for establishing risk-based profiling procedures, and the business decision-making requirements of the administering financial institution and to meet the requirements and expectations of the customer. The survey methodology is tailored to minimize the input required for a given customer by continually revising the survey queries based on the customer information received. At the same time, risk factors associated with the information received are aggregated to determine an overall risk for a particular customer. The methods of the invention are usable in front-end CIP procedures as well as in processes for assessing and reassessing risk through the life of a customer/institution business relationship.

It will be understood that throughout this specification, the term "customer" may apply to any individual, business, organization or other entity having or seeking to open an account, applying for a loan or otherwise having or seeking to establish a business relationship with a financial institution or other entity required to comply with government regulations relating to, for example, the gathering of customer information and/or identification of potentially suspicious activity.

Central to compliance with the regulations arising out of the USA PATRIOT Act, is the need to efficiently determine and quantify the risk associated with a potential customer. The methods of the invention are predicated on the concept that every customer has an inherent level of risk based on the customer's identifiable personal characteristics and on the customer's historical and projected transactional behavior. In the methods of the invention, the overall risk associated with a particular customer is continually updated as information relating to these characteristics is received.

Customer information is typically gathered through the use of an application form or survey with questions or blanks that may be filled in by the customer or by an employee of the financial institution. Information relating to customer characteristics may be taken from the survey and assembled into a customer information set. In some instances, customer information may be taken from data obtained through prior dealings with the customer or from sources other than the customer. It will be understood that certain customer characteristics may be associated with higher behavioral uncertainty and, accordingly, higher risk. Further, some customers will have certain characteristics that suggest the need to obtain additional information in order to fully assess their associated risk and comply with regulatory criteria. Such additional information may not be needed for customers not having those certain characteristics. For example, if it is determined that a customer is not a U.S. citizen, a variety of additional information relating to the customer's origins and nationality may be required. Thus, the number of characteristics for which information is required for compliance and to assess overall risk may be smaller for a U.S.-based customer than for a non-U.S.-based customer.

Because not all customers have the same characteristics, many will not need to provide the "additional" information. The result is that the overall number of questions that may be required for compliance could be significantly larger than the number of questions actually required for a particular customer.

An aspect of embodiments of the invention is to seek, obtain and process only the information necessary to meet regulatory criteria for a given customer. Accordingly, the invention provides methods of obtaining customer information that tailor themselves to the characteristics of the customer as information on those characteristics is received. FIG. 1 is a high level flow diagram illustrating a conceptual method 100 of optimizing a customer information survey in accordance with an embodiment of the invention. The method 100 begins at S105. At S110, a basic question set is established using questions from the universe of questions that may be required to gather information for regulatory compliance. The basic question set includes only those questions to which all customers will be required to respond, regardless of their individual characteristics. At S120, an expected (i.e., probable or likely) answer is established for each of the basic questions. The expected answer may be determined from empirical data and may be based on a variety of factors including, for example, customer demographics, the nature and location of the financial institution and the types of products and services offered by the financial institution. At S130, one, some or all of the questions from the question set is submitted to the customer or a customer interviewer to obtain responses, which are received at S140. In some instances, the financial institution may already have some customer information or may have access to publicly available information. In either case, such information may be used to provide default answers to some of the survey questions without direct customer input. The corresponding questions may then be bypassed in the survey process or displayed to the customer with the default answers for confirmation by the customer.

At S150, the answers obtained at S140 are compared to the expected answers to determine if any unexpected answers were received. If only the expected answers are received, no changes are made to the question set. If, however, an unexpected answer (i.e., an answer other than the expected answer) is received, the question set may be revised at S155. This revision would typically involve adding one or more additional questions to the question set but, under certain circumstances, could also involve removal of questions from the question set. Questions from the revised question set are then resubmitted to the customer for response. The actions of submitting questions to the customer, receiving answers, determining if any answers are unexpected and, if necessary, modifying the question set, may be repeated until all the questions in the question set have been answered. The information taken from the answers may be stored in a customer information set at S160 and the method 100 ends at S195.

It should be noted that the effectiveness of the method 100 may be affected significantly by the way in which the questions are presented to the customer at S130. For example, if all the basic questions are submitted at once, any questions added as a result of unexpected answers would not sequentially follow the answers that prompted their addition. This may result in a poor experience for the user and the customer. If, on the other hand, the questions are submitted and answered one at a time in a predetermined sequence, additional questions will flow naturally from the questions to which unexpected answers are received. The efficiency of the method 100 may also be affected by the way in which the question set is modified. For example, if the information in unexpected answers can be anticipated, the additional questions that will need to be asked as a result of such answers may be determined in advance.

Although not shown in FIG. 1, the method 100 may also include steps relating to the computation of risk for the customer being surveyed. For example, a basic estimated risk level may be established for a customer who provides only expected answers. When unexpected answers are received, the estimated risk level may be appropriately raised or lowered depending on the answer. As will be discussed in more detail below, there are a variety of ways in which an aggregate risk level may be computed using contributing factors associated with anticipated answers to survey questions.

Figure 2B:
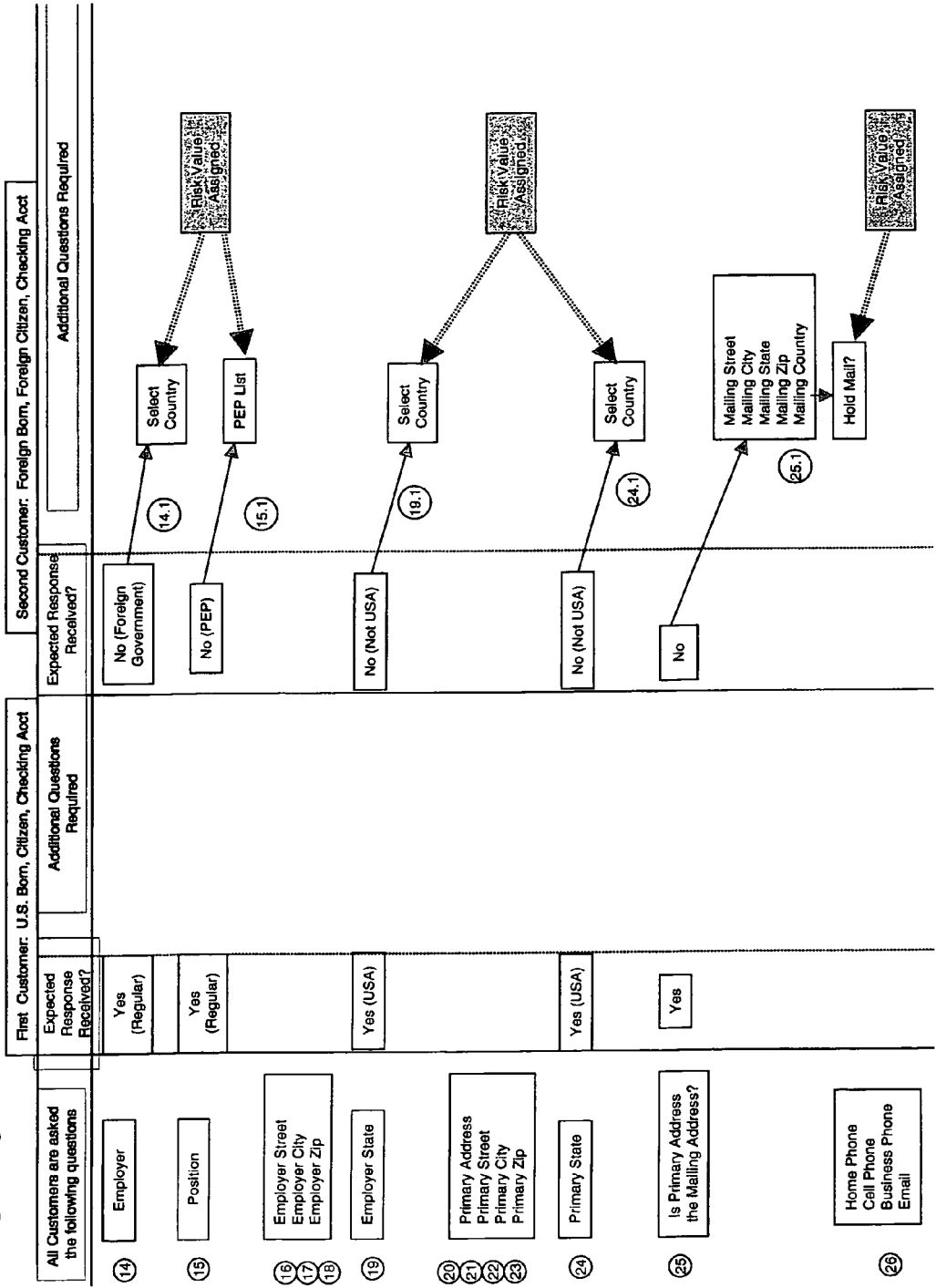
FIG. 2, which is made up of FIGS. 2a, 2b and 2c, is a chart comparing the questions that must be asked for two hypothetical customers in order to comply with certain government regulations.
Figure 2C:
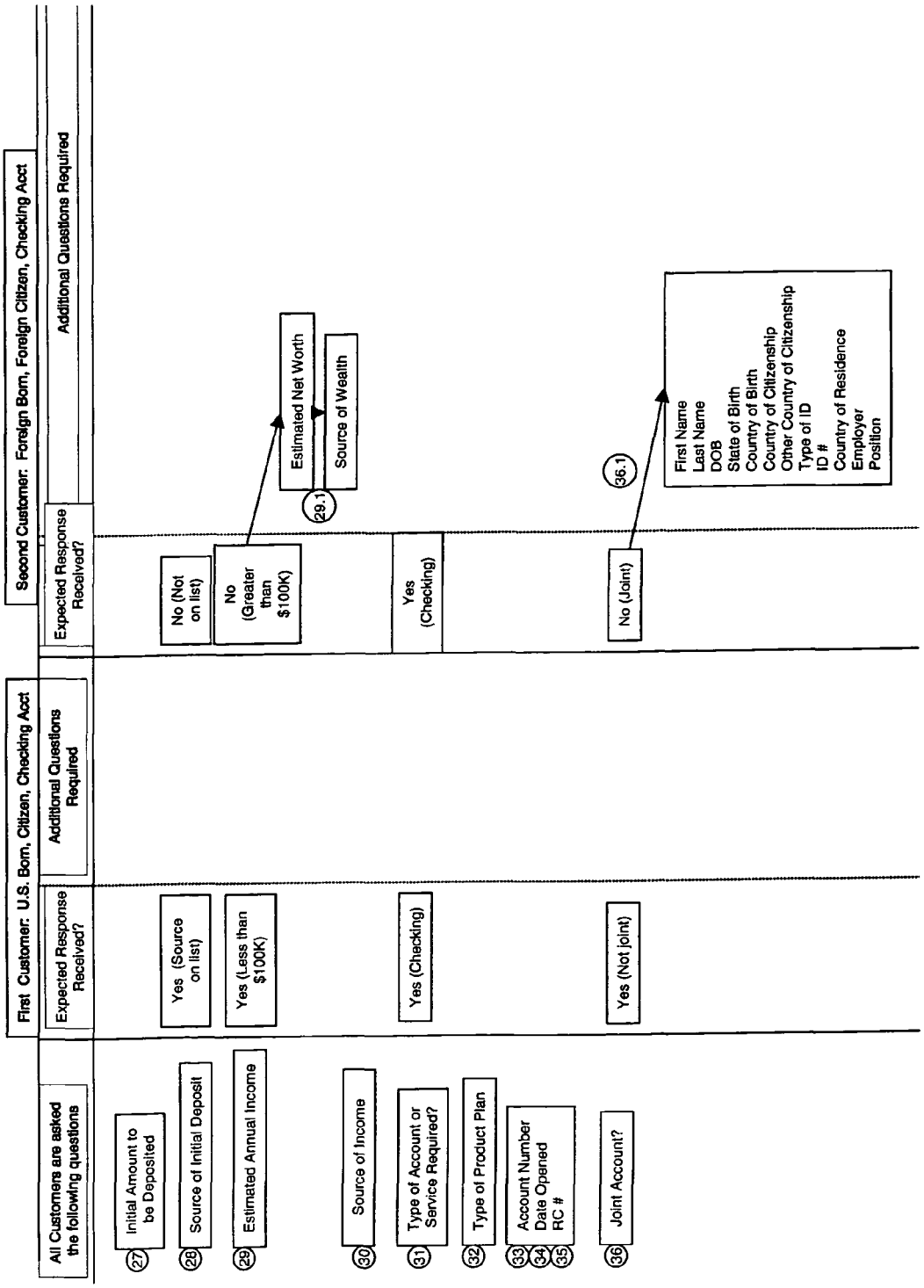

To illustrate the effect of an optimized customer information survey, FIGS. 2a, 2b and 2c show a chart of the questions asked of two hypothetical customers: a first customer who is a U.S.-born U.S. citizen who wishes to open a checking account; and a second customer who is a foreign born, non-U.S. citizen who wishes to open a joint checking account. The chart shows a list of basic questions in the left-most column, information relating to the survey questions asked of the first customer in the center portion of the chart and information relating to the second customer in the right-hand portion of the chart. In each of the customer sections, a first column indicates whether the customer provided an expected answer to the associated question in the left-hand column and a second column shows any additional questions that were required as a result of unexpected answers. The second column also shows examples of where answers may prompt a risk value assignment or calculation.

It can be seen from the comparison chart in FIG. 2 that the first customer provided no unexpected answers. As a result, the first customer needed to respond to only 36 questions in order to a fully compliant customer information set to be constructed. The second customer, however, provided a number of unexpected answers that resulted in the need for additional questions. The unexpected answer of a country other than the U.S. for questions 7 and 9 resulted in the need for the additional questions shown at 7.1-7.5 and 9.1-9.5. In answer to question 12, the second customer indicated he would provide an atypical form of identification. This resulted in additional questions at 12.1. Unexpected answers to questions 14, 15, 19, 24, 26, 29 and 36 also resulted in additional questions. As a result of the unexpected answers, the second customer was required to answer more than fifty additional questions. The second customer's answers also prompted the assignment of additional risk values at a number of points in the survey.

Clearly, it is undesirable to force the first customer in the example above to face a survey form or process that included all the questions asked of the second customer. The above-described method 100 shows how a survey question set may be modified and optimized based on the answers received to avoid this problem. It will be apparent that this simple approach can, in theory, be carried out by an interviewer, who simply evaluates the information he receives in answer to basic questions and structures subsequent questions based on that information. In this way, the interviewer tailors his session with a customer to minimize the number of questions he must ask. The primary advantages of the invention, however, are realized when the methods of the invention are automated.

Figure 3:
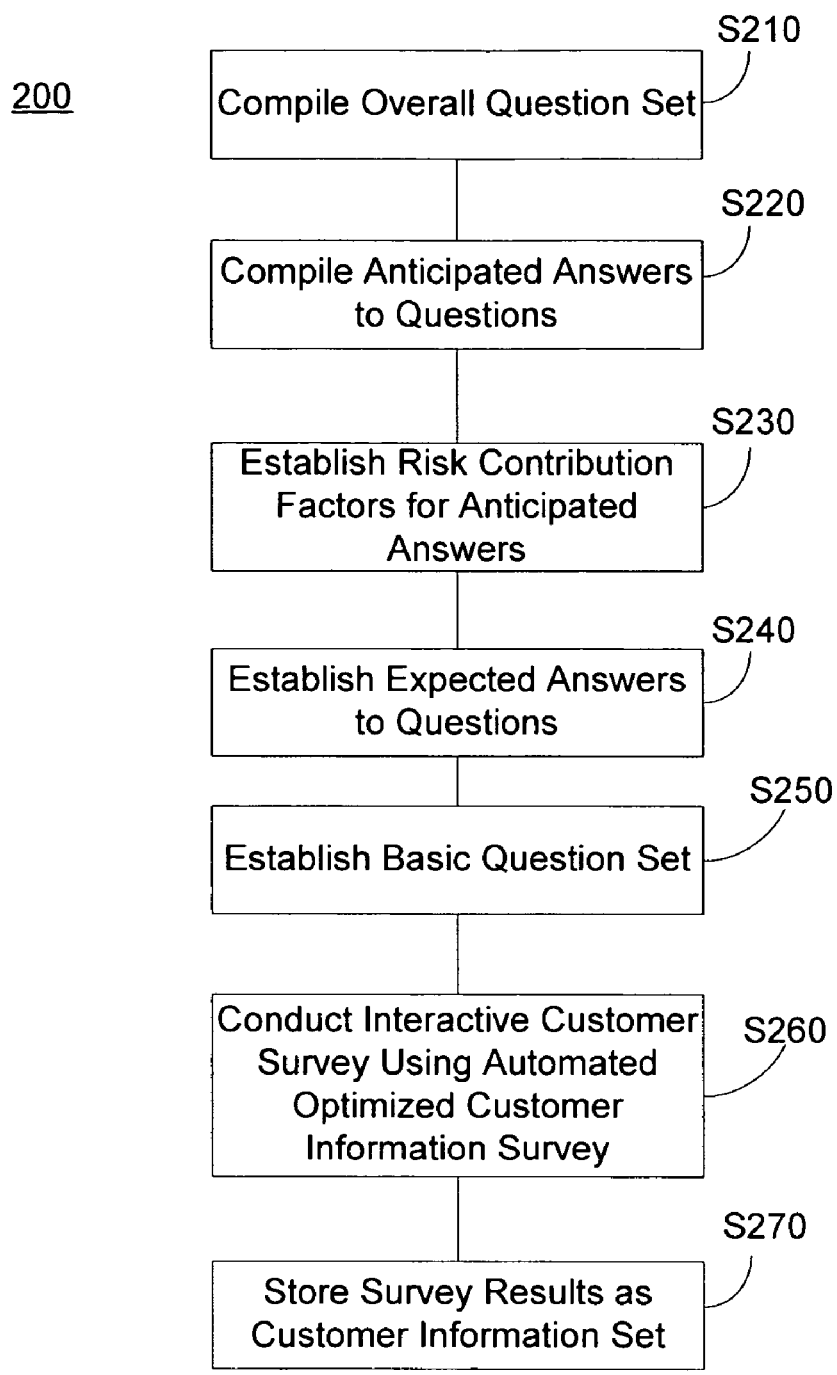
FIG. 3 is a flowchart of a process of establishing and conducting an automated, optimized customer information survey according to an embodiment of the invention.

In order to provide a fully compliant automated customer survey, the automated system must, of course, have access to all possible questions needed for compliance. In order for the automated survey to be optimized, the system must also be provided with a basic initial question set and a methodology and criteria for interactively revising the question set. FIG. 3 illustrates steps that may be conducted during the process of establishing and conducting an automated, optimized customer information survey. At S210, an overall question set including all possible questions that may be required in order to fully comply with regulatory requirements and with the requirements of the surveying institution in providing service to the customer. At S220, a set of possible answers that may be anticipated for various questions are assembled. For example, if the information required is the country of citizenship, a set of anticipated answers may include any or all of the established nations in the world. Some questions may have anticipated answer ranges. For example, a customer may be asked to provide a specific number for annual income. The anticipated answers for the annual income question, however, may be stated in ranges, one of which will include the number provided by any given customer. It will be understood that some questions such as those asking for name and address information may not have anticipated answers.

Anticipated answers are significant because they may provide a basis for assigning risk factors to specific characteristics of a customer. At S230, risk contribution factors are established for the anticipated answers. As will be discussed in more detail below, these risk factors may be a simple additive value assigned to a particular anticipated answer or group of answers or may be a systematic change factor for use in a more complex risk model. A given anticipated answer may or may not have an impact on the overall risk associated with a customer.

At S240, expected answers to various questions are assembled. While anticipated answers are those determined by the administering institution to be possible answers for a given question, an expected answer is one determined by the administering institution to be a likely, or the most likely, answer. As discussed above with respect to the basic survey method 100, expected answers can be used to tailor a survey to a particular customer. It is this approach that allows the survey to be optimized for as customer information is received. It will be understood that some questions may not have an expected answer. Only those questions that will be used to trigger an expansion or contraction of the question set or that may trigger a change to the overall risk computation for a customer need be provided with an associated expected answer.

Under some circumstances, a particular question may have more than one expected answer. For example, a question may ask for a form of identification. If there are several likely forms of identification, none of which will result in the need for additional questions or that will involve additional risk, an answer of any of these forms of identification could be considered an expected answer.

At S250, a basic question set may be established. The basic question set would consist of some or all of the questions of the overall question set. The basic question set represents the starting point of the survey. In a preferred approach, the basic question set would comprise those questions for which information will be required from all customers. The basic question set will include questions with expected answers so that when unexpected answers are received, the basic question set may be modified to provide appropriate questions based on the unexpected answers.

At S260, an automated interactive survey is conducted. The automated system used to conduct the survey may be provided with the overall question set, the basic question set, anticipated answers and expected answers. The automated system may also be provided with the risk contribution factors associated with the anticipated answers. The information gathered by the survey may be assembled and stored in the form of a customer information set at S270.

An optimized interactive survey comprising the actions shown in FIG. 3 may be conducted as part of a standalone business initiation survey process or as part of an account transaction. Optimized interactive surveys using the methods of the invention are particularly effective at the front-end of a business relationship when little or no information on a particular customer is otherwise available to the administering institution.

Figure 4:
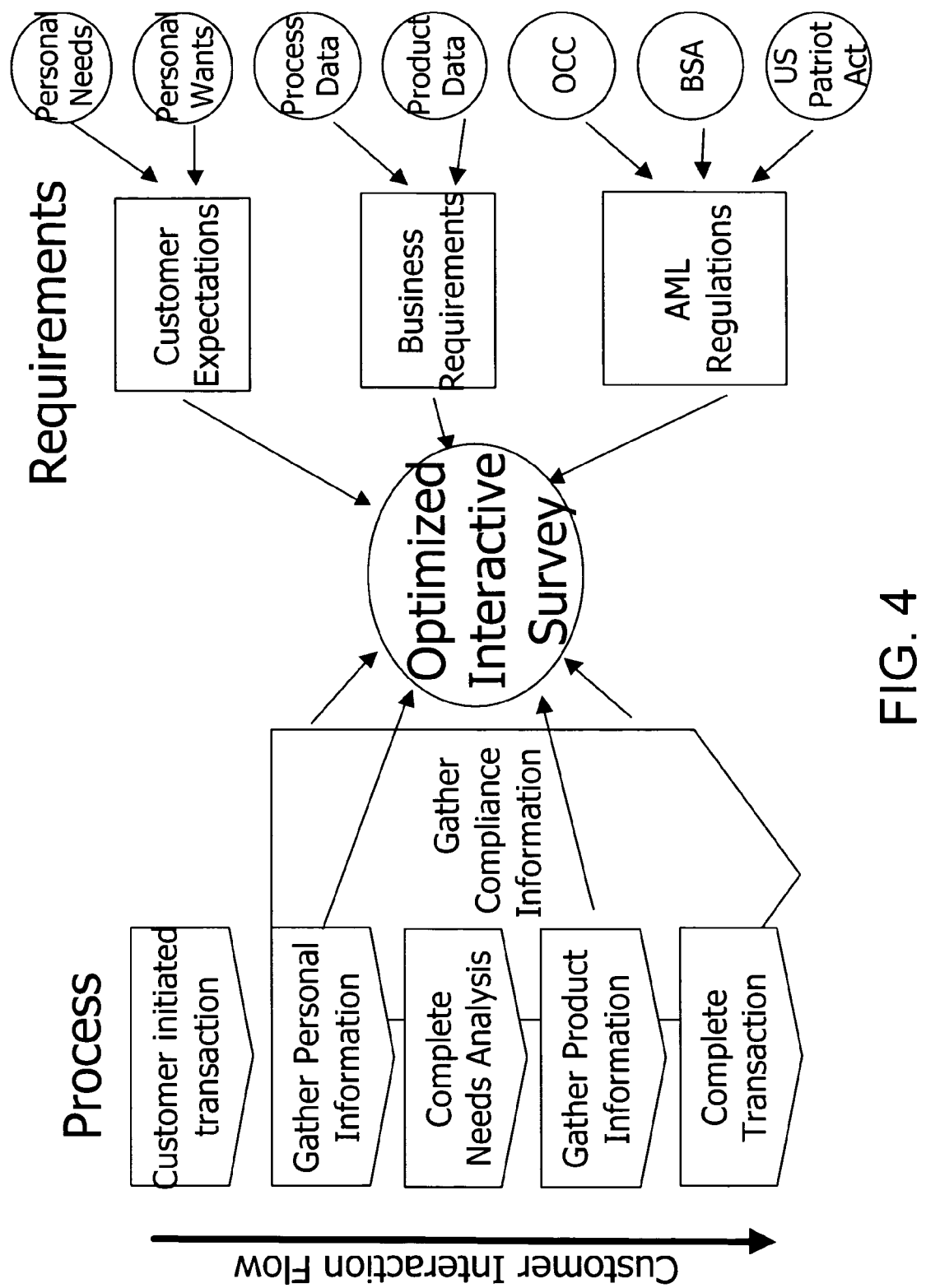
FIG. 4 is a schematic flow diagram illustrating the contributors to an optimized interactive survey according to embodiments of the invention.

A process of establishing and conducting an optimized survey having some or all of the actions of FIG. 3 allows a financial institution to bring its expertise to bear to provide a survey tool that balances the time constraints of the customer with regulation compliance and the needs and policies of the financial institution. FIG. 4 is a schematic representation of how this balance is accomplished and how the survey may be used as part of a customer transaction. The methods of the invention may be carried out at any time during a business relationship, but are particularly useful at or before the opening of an account with a new customer. As shown in FIG. 4, the survey processes of the invention may be smoothly incorporated into a customer-initiated transaction such as the opening of a checking account or an application for a loan.

The automated methods of the invention may be carried out using a data processing system programmed to interactively display questions and receive answers to and from a customer either through direct interaction with the customer or through an interviewer or other user. As will be discussed, if an interviewer or other intermediary is used, the questions of the survey may or may not be visible to the customer.

Figure 5:
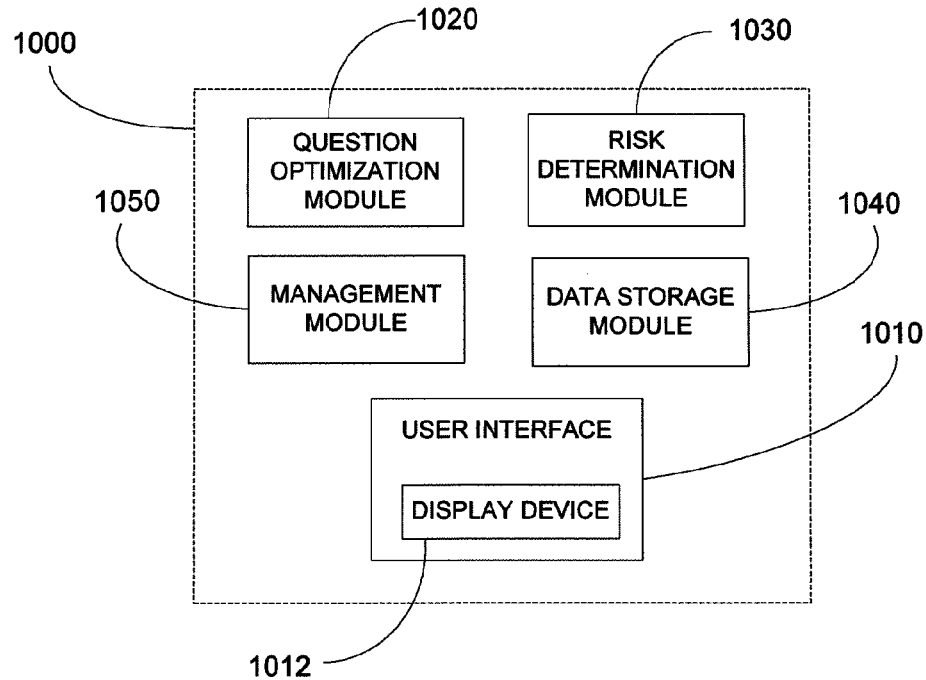
FIG. 5 is a data processing system for compiling a customer information set according to an embodiment of the invention.
Figure 6:
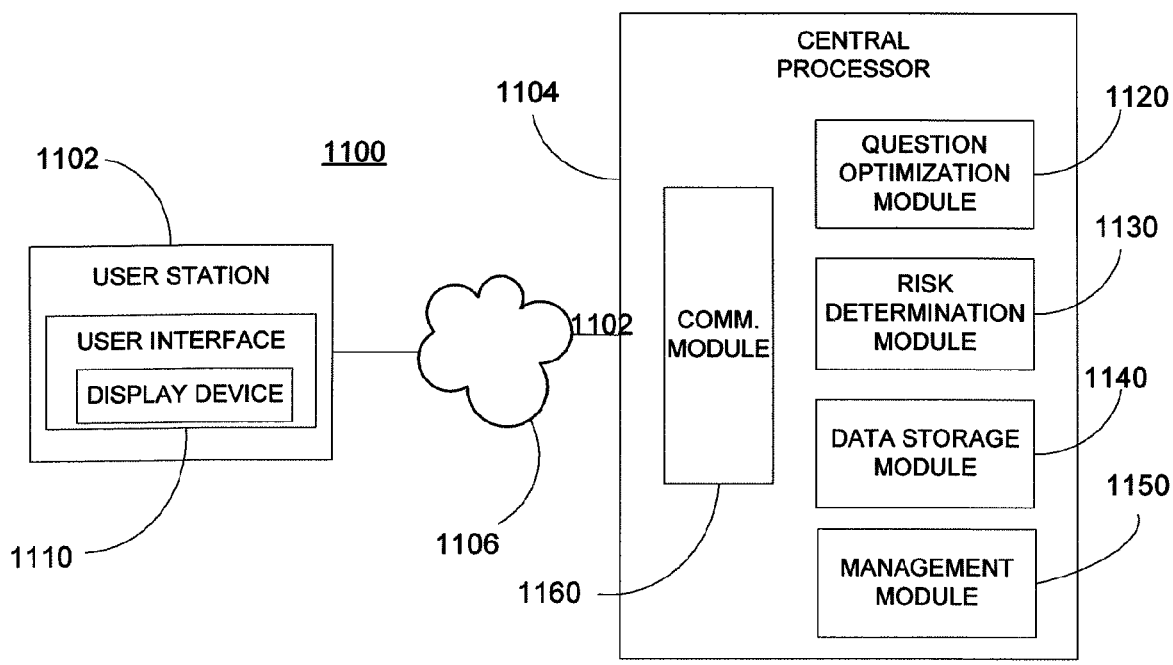
FIG. 6 is a data processing system for compiling a customer information set according to an embodiment of the invention.

FIGS. 5 and 6 illustrate examples of processing systems that may be used to carry out the methods of the invention. FIG. 5 shows an illustrative standalone processing system 1000, which may be, for example, a desk top computer or work station. The processing system 1000 has a user interface 1010, a question set optimization module 1020, a risk computation module 1030, a data storage module 1040 and a management module 1050. The user interface 1010 may include a display 1012 adapted for displaying one or more questions to a user and a user input device 1014 adapted for receiving input such as answers or other customer information from the user. The question set optimization module 1020 may be adapted to determine which questions are displayed to the user and it what form. The risk computation module 1030 may be adapted to compute incremental and/or aggregate risk factors for a particular customer based on the answers received from the user. The data storage module 1030 may be used to store, among other things, questions, expected answers, actual received answers and customer information sets. The management module 1050 may be configured to provide any of various functions for adapting the system 1000 to the needs of a particular financial institution.

FIG. 6 shows another illustrative processing system 1100 that may be used to carry out the methods of the invention. The processing system 1100 comprises a user station 1102 connected to a central processor or server 1104 via a network 1106. In this system, the question set optimization module 1120, risk computation module 1130, data storage module 1140 and management module 1150 are part of the central processor 1104. The central processor 1104 may also include a communication module 1160 adapted for passing information to and from the user interface 1110, which is part of the user station 1102, over the network 1106. It will be understood that the user station 1102 may be one of a plurality of user stations in communication with the central processor 1104 over the network 1106. In one embodiment, the user station 1102 may be a home or business computer connected to the central processor 1104 through the Internet. In this embodiment, the user sends and receives information to the central processor 1104 using the browser on the user's computer.

It will be understood that the question optimization module, risk computation module and data storage module need not be co-located in a single processor. For example, in an exemplary alternative embodiment (not shown), the question optimization and risk computation modules may be located at a user station with the user interface, while the data storage module is located at or is accessible through a central processor.

Customer information surveys using either of the processing systems 1000, 1100 may be conducted with or by an interviewer or other intermediary who obtains the information from the customer. In these instances, the actual questions and other information displayed at the user station may be hidden from the customer. In some systems, the user station could include multiple display devices so that some or all of the displayed information may be separately displayed to both the interviewer and the customer or so that one set of information is displayed to the customer and a second set of information is displayed to the interviewer. For example, the interviewer's display device may show the question set and provided answers along with associated risk computations while the customer's display device shows only the questions and answers.

The processing systems 1000, 1100 may also be used to conduct surveys without an interviewer or intermediary. In these instances, the questions and other information are displayed directly to the customer.

Figure 7:
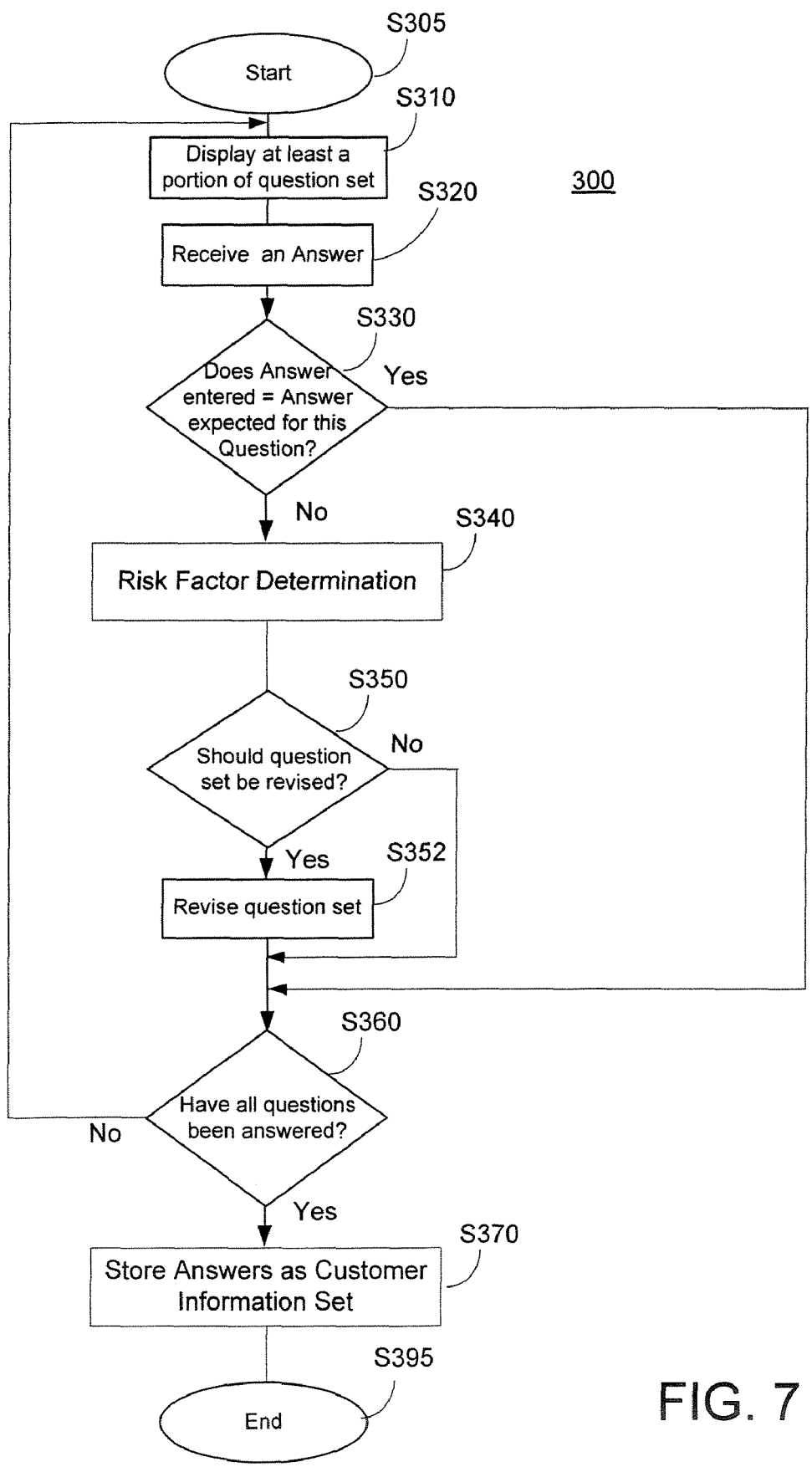
FIG. 7 is a flowchart of a method for compiling a customer information set according to an embodiment of the invention.

Turning now to FIG. 7, a method 300 of conducting an automated, optimized and compliant customer information survey according to an embodiment of the invention is provided. The method 300 begins at S305 and at S310, at least a portion of a current survey question set is displayed using a display portion of a user interface. The current question set includes a plurality of questions taken from an overall question set containing all possible questions that might need to be asked in order to assure compliance with regulatory criteria.

The overall question set might also include questions that are needed in order to meet the needs of the customer, financial institution or both. It can be seen that the current question set is a subset of the overall question set. At the start of the survey, the current question set may be set to equal a basic question set including all of the questions that all customers must answer. The basic question set may be set to consist of the absolute minimum questions that any customer might be required to answer. By setting the current question set to be the basic question set at the start of the survey process, a default is established whereby the minimum number of questions will be directed to the customer unless the current question set is modified during the survey.

It will be understood that the overall question set and the basic question set may be stored in a data storage portion of the processing system from which they may be retrieved for use as needed. The current question set may also be stored and retrieved as needed.

The action of displaying at least a portion of the current question set may include displaying a single question from the current question set or a plurality of questions from the current question set. In some embodiments, all of the current question set may be displayed or selectively displayable to the user. As used herein, the term "question" means any statement, query, prompt, fill-in space, check-box, etc. that asks the user to supply a particular piece of information in response. Questions may be displayed in any of a variety of forms. In one simple approach, a single question may be displayed requesting the input of a single answer in response. Alternatively, a plurality of questions may be displayed for which answers may be entered in sequence or simultaneously. In a more complex approach, a form having a series of input fields may be displayed, each input field having associated indicia suggesting a question that may be answered by entering data in the input field. When all the fields are complete, the form is submitted by the user for processing of the answers.

At S320, an answer is received from the user via a user interface input device. It will be understood that the received answer is associated with a particular question and may be received by itself or along with answers to one or more other questions. At S330, the received answer is compared to an expected answer for the associated question. As previously discussed, an expected answer may be one that has been determined to be a likely or most likely response to an associated question. If the received answer is the same as, or substantially the same as, the expected answer, the method proceeds to S360, where a check is performed to determine if all the questions of the current question set have been answered.

As used herein, the term "answer" means any form of data provided or obtained in response to a question. This includes but is not limited to any textual information, choice selection (e.g., by "marking" a check-box, or making a pull-down selection on a computer screen), numerical entry, or other form of verbal, written or user-input data. It may also include electronic data passed from one data processing device to another.

If at S330 the received answer is an unexpected answer (i.e., is not substantially the same as the expected answer), the method proceeds to S350 where a determination is made whether the current question set should be updated. As will be discussed below, actions associated with an optional risk factor determination may be conducted at S340. The determination at S350 may be made based on predetermined question set modification criteria. Such criteria may be associated with particular answers to particular questions. For example, if an anticipated answer to a particular question is known to be associated with customer characteristics that will require additional questions over and above those of the current question set in order to comply with regulatory requirements, it would be desirable for the processing system to update the current question set by adding the additional questions. Accordingly, anticipated answers that will trigger a need for additional questions may be stored for comparison with received answers. The determination at S350 may then include comparing a received answer with anticipated answers that may trigger the additional questions. If the received answer is substantially the same as one of the anticipated answers, the associated additional questions drawn from the overall question set may be added to the current question set at S352. It will be understood that under some circumstances, matching an anticipated answer could trigger the removal of one or more questions from the current questions set.

If the received answer matches an anticipated triggering answer, the current question set may be revised at S352. The method then proceeds to S360 to determine if there are unanswered questions in the current question set. If the received answer does not match one of the anticipated triggering answers, the current question set remains unchanged and the method proceeds directly to S360.

It will be understood that the determinations at S330 and S350 may be accomplished sequentially for multiple answers or may be accomplished for multiple answers simultaneously so that the current question set may be revised only once for a given set of received answers.

If all of the questions of the current question set have been answered, the method proceeds to S370 where the answers may be assembled into a customer information set and stored. The method then ends at S395. If there are questions in the current question set that have not been answered, the method returns to S310 where at least a portion of the updated current question set is displayed to prompt the user for more answers.

The use of expected and anticipated answers in the automated method 300 provides the means to streamline the survey to minimize the number of questions that a particular customer will be required to answer. They may also be used to automatically determine the risk factors associated with characteristics that differ from a baseline customer profile. As noted above, the automated survey method 300 may include an optional risk determination procedure S340. The risk determination procedure S340 may be performed for any or all received answers. Thus, the procedure S340 may be performed at any time after an answer has been received. However, it may be particularly efficient to perform the risk determination procedure S340 only after an unexpected answer has been received. This is because the risk contribution of an expected answer may already have been accounted for calculating the aggregate customer risk before the expected answer is received. If, however, an unexpected answer is received, any risk factor associated with the unexpected answer must be accounted for.

Figure 8:
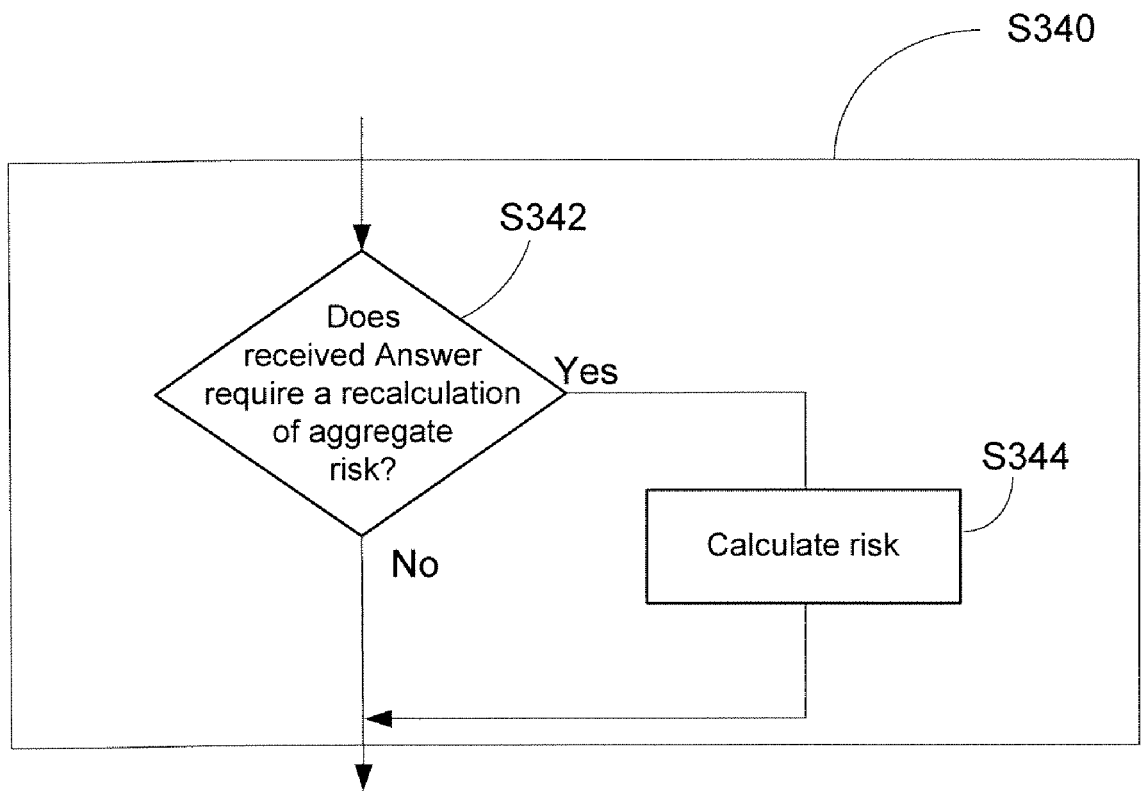
FIG. 8 is a flowchart of a procedure for calculating risk according to an embodiment of the invention.

FIG. 8 illustrates an exemplary risk contribution determination procedure S340 that may be used in methods of the invention. The procedure S340 may comprise a determination S342 of whether a recalculation of the aggregate risk is required by a particular received answer. The determination at S342 may be made based on predetermined risk calculation criteria. As with the question set modification criteria discussed above, the risk calculation criteria may be associated with particular answers to particular questions. In particular, the risk calculation criteria may include whether the received answer matches an anticipated answer for the associated question. For example, if certain anticipated answers for a given question are known to be associated with customer characteristics that have been correlated to increased risk, a received answer may be compared to these answers to determine if the current aggregate risk should be recomputed, taking the received answer into account.

Accordingly, anticipated answers that will trigger a need for recalculation of the aggregate risk associated with a customer may be stored for comparison with received answers. The determination at S342 may then include comparing a received answer with anticipated answers that may trigger a recalculation. If the received answer is substantially the same as one of the anticipated answers, the aggregate risk may be recalculated at S344. The recalculation at S344 made include any of a variety of determinations and calculations depending on the methodology used to calculate the aggregate risk for a customer. Any suitable risk calculation method in which the effects of a particular customer characteristic may be factored is usable in the methods of the invention. For example, in one illustrative method, a current aggregate risk for a customer would initially be set at a baseline aggregate risk value representing the risk level for a customer who provides only expected answers. An answer specific additive risk factor (which may be positive or negative) may be associated with each of a predetermined set of anticipated recalculation-triggering answers. Each time a received answer matches an anticipated recalculation-triggering answer, the associated risk factor may be added to the current aggregate risk. The addition of a positive risk factor may indicate a simple additive increase in the current aggregate risk associated with the customer. The addition of a negative risk factor may indicate a decrease in the aggregate risk.

The simple additive risk approach provides a way of tracking the effects of answers to questions through the course of a survey. However, this approach does not account for the interactive effects of various customer characteristics. For example, a customer may have provided an answer indicating that a selected financial product of interest is a mortgage loan, which differs from the expected answer. The contribution of this answer to the overall risk value for the customer may differ depending on the customer's previously submitted answers relating to, for example, citizenship or income. To overcome such concerns, the aggregate risk calculation at S344 may include computations based, not only on the received answer triggering the calculation, but on one, some or all previously answered questions. This allows the use of interdependent calculations based on predetermined relationships that can be associated with anticipated answers. It will be understood that aggregate risk for a customer may still be calculated as the sum of individual risk factors calculated for each of a series of customer characteristics (or associated anticipated answers). Alternatively, the aggregate risk itself may be calculated directly from empirical correlations using risk contribution factors for various characteristics as input values.

The data processing system used to carry out the methods of the invention may be configured or programmed to provide as output or to display the current aggregate risk at any time during the conduct of a survey. This can allow interim decisions to be made that can shorten the survey process further. For example, any of the methods disclosed herein can terminate the process based on the determination of a current risk factor that exceeds a threshold value.

It will be understood that from time-to-time, a financial institution may wish to change one or more predetermined risk factor values or change the form of the calculations used to calculate aggregate risk. Embodiments of the invention provide the capability to make revisions to the risk calculation model at some later time after a customer information set has been established for a particular customer. The customer information set may be configured to include all the answers provided during a previous survey transaction. The customer information set may be retrieved from storage and the previously submitted answers used to re-compute the aggregate risk for that customer using the new risk model.

Anticipated answers may be used for other purposes in addition to triggering changes to the current question set or to the aggregate risk calculation. For example, certain informational messages or other information be displayed to the user or incorporated into the customer information set. For example, citizenship in any of certain predetermined countries may qualify a customer for a Financial Crimes Enforcement Network (FinCEN) designation. While this may or may not affect the current question set or the aggregate risk, it may be information that should be displayed to an interviewer or stored for later reference. To accomplish this, the survey methods of the invention may include comparing received answers to certain questions to anticipated answers for these questions in order to determine if predetermined status flags should be set. For the FinCEN example, the processing system may be configured or programmed to compare any unexpected citizenship answer (for U.S. financial institutions, this likely to be any answer other than "U.S.") to a list of FinCEN countries. If the received answer matches a country on the list, a FinCEN flag could be raised.

The methods of the invention may be used to conduct surveys in which there are interconnections and dependencies between questions. In some embodiments of the invention, an answer received for a first question may be used as a basis for establishing a default answer to a second question. The second question and the default answer may then be displayed to the user. Depending on the question and other criteria that may be established by the survey manager, the user may be allowed to override the default answer by supplying an answer manually. In some instances, manually overriding the second answer will, in turn, cause the first answer to be changed or will require that the user re-enter an answer to the first question.

In some embodiments of the invention, automated, interactive, optimized survey methods may involve the use of one or more data entry display screens that may be used to prompt a user to enter answers into specific data fields using a graphical user interface (GUI) or similar device. These display screens may be used to display one, some or all of the questions in the current question set at any given time in the survey process. As questions are answered by entering data in the appropriate fields, the display screens may changed or replaced to add or subtract questions. The processing system may be configured or programmed so that answers are automatically entered upon movement of a cursor from one entry field to another. In one alternative to this approach, however, the system may be configured or programmed so that answers are submitted for processing selectively by the user, either one at a time or in groups. For example, a "Submit Answers" button may be included on the display screen that when selected by the user causes all previously unsubmitted answers to be submitted. In another variation, a particular display screen may be made up of questions that have been grouped together because of their relationship to one another. The processing system may be configured or programmed so that answers entered into the fields on this page are not submitted until another page is selected, such as by a tab or menu selection.

Whenever answers are submitted for processing by the user, the processing system will compare the received answers to the expected answers for the transaction being conducted or anticipated. When unexpected answers are received, the system determines whether the current question set should be modified and the display screens updated to reflect the modifications. Questions removed from the current question set may be removed from the screen being displayed to the user or from any screens that are not being displayed but are displayable by the user. Questions added to the current question set may be added to the screen being displayed to the user or to any screens that are not being displayed but are displayable by the user. Added questions may also be provided to the user in the form of a new screen that is displayed to the user or is selectively displayable by the user.

Figure 9:
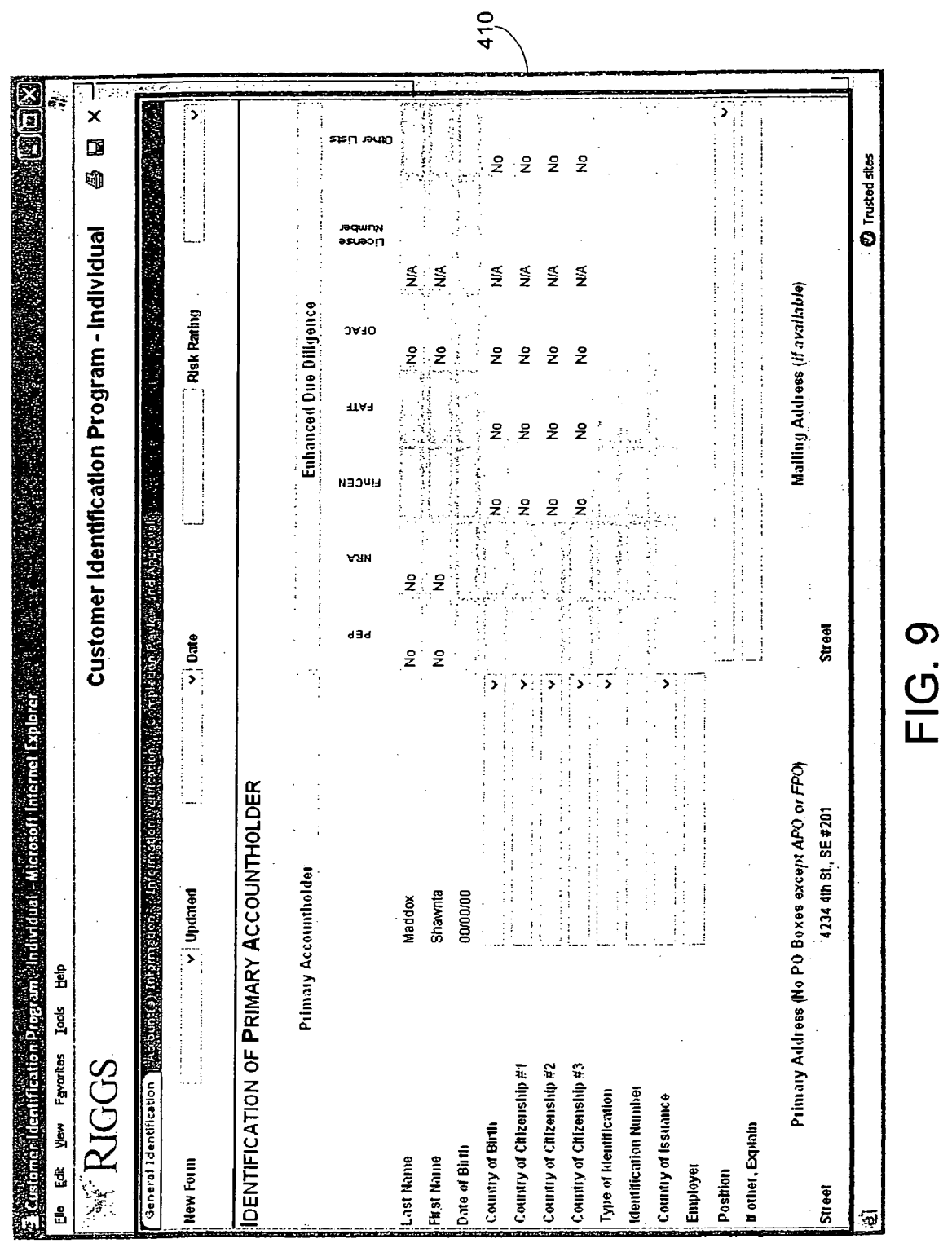

The above-described display screens provide a "hide and show" feature wherein only the questions deemed necessary based on previously submitted answers and based on expected answers to the unanswered questions remaining in the current question set are displayed or selectively displayable by the user. FIGS. 9-13 illustrate the use of these display screens in carrying out the methods of the invention. FIG. 9 is a screen shot showing a portion of a display screen 410, which may be displayed to an automated survey user on a GUI. The display screen 410 includes question indicia for a plurality of questions, each having an associated answer field for entering an answer. Questions that may require answers for compliance purposes are indicated by an inverted carat symbol. The questions shown in display screen 410 may be typical of questions that would be part of a basic question set that would be answered by all customers surveyed. The display screen 410 also includes a number of optional information fields and a number of fields that will be automatically populated as answers are received and processed. It will be understood that the portion of the display screen 410 that is shown in FIG. 9 is the portion of the display screen 410 initially visible to the user. The remainder of the display screen 410 is viewable by the user through the use of the scroll bar at the right of the display screen 410. Portions of the display screen 410 may also be "collapsed" to selectively hide all but the title of groups of questions that do not need to be viewed at a given time.

Figure 10:
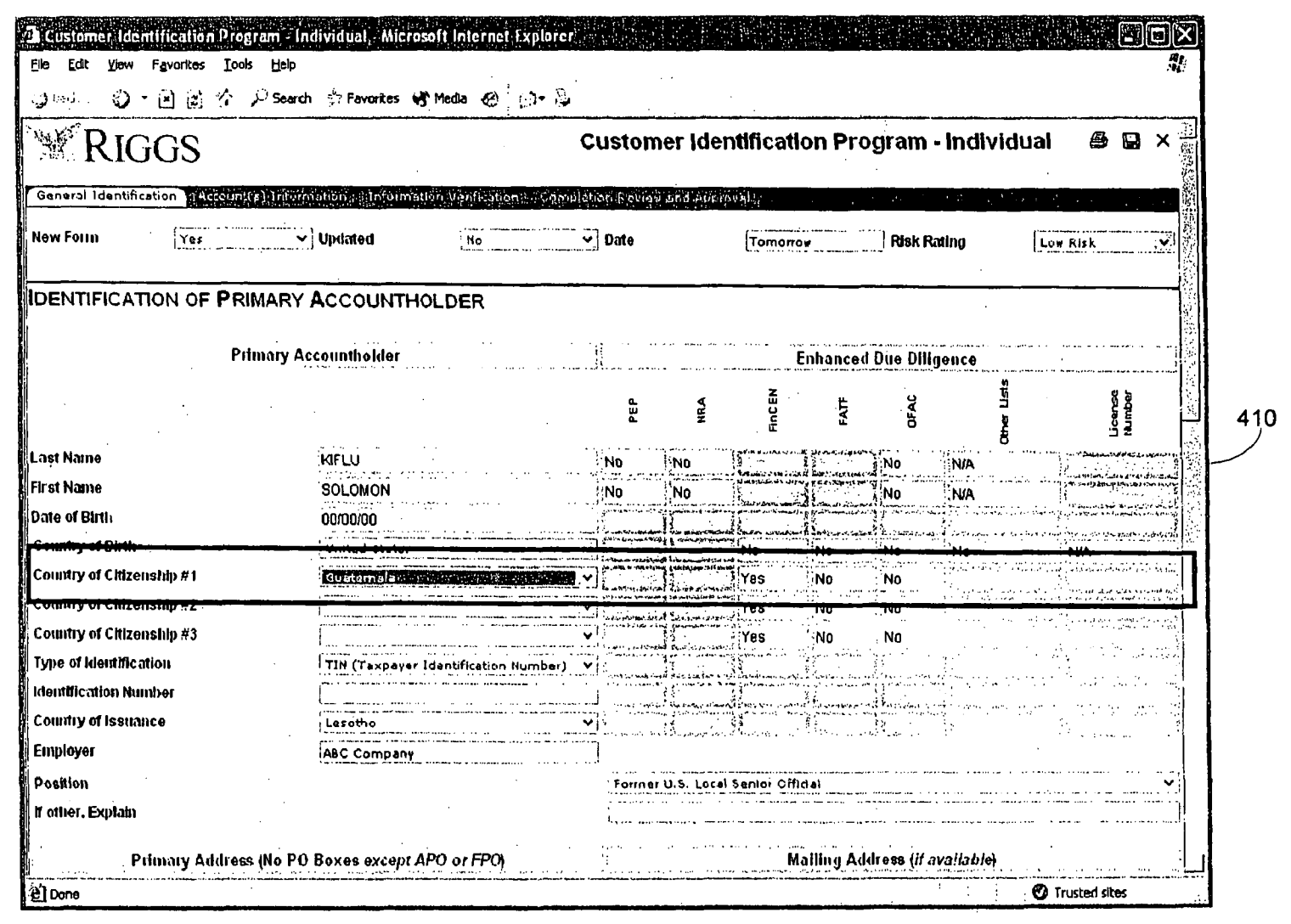

FIG. 10 is a second screen shot of the same portion of display screen 410 with information entered for a number of questions. Included in the answers entered was "Guatemala," which was provided in response to the Country of Citizenship #1 question (see highlighted line). In this example, the received answer "Guatemala" was matched against a set of anticipated answers including all countries that produce a FinCEN designation. As a result of a match being found, the default value in the FinCEN entry for this question was changed from the default value of "No" to "Yes."

Figure 11:
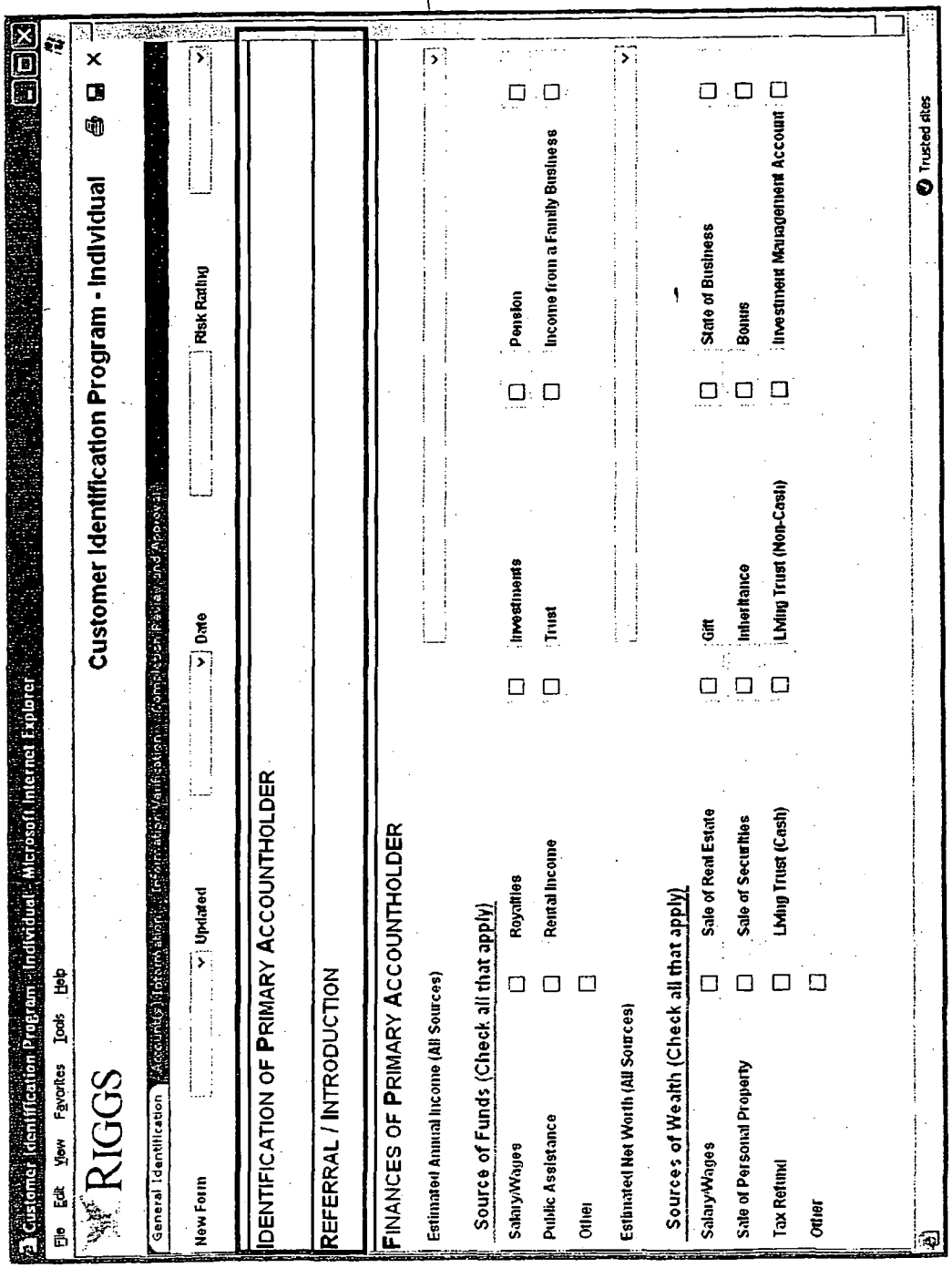
FIG. 11 is a screen shot of the question display screen of FIG. 9 with portions of the display screen collapsed so that a second portion of the display screen may be viewed.

FIG. 11 shows a different portion of display screen 410 that has been made visible by collapsing the portions of the screen containing questions relating to "Identification of Primary Accountholder" and "Referral/Introduction." The portion of screen 410 shown in FIG. 11 comprises a series of unanswered questions relating to income sources of a customer. FIG. 12 shows a corresponding portion of a modified display screen 410A in which answers have been supplied to the sources of wealth questions through the checking of the "Other" box and the boxes for "Living Trust (Cash)," Living Trust (Non-Cash)" and "Investment Management Account" (highlighted). These unexpected answers caused the current question set to be modified by inserting additional questions and the display screen 410 to be revised to display these additional questions. The additional questions are displayed in the highlighted area at the bottom of the screen.

Figure 13:
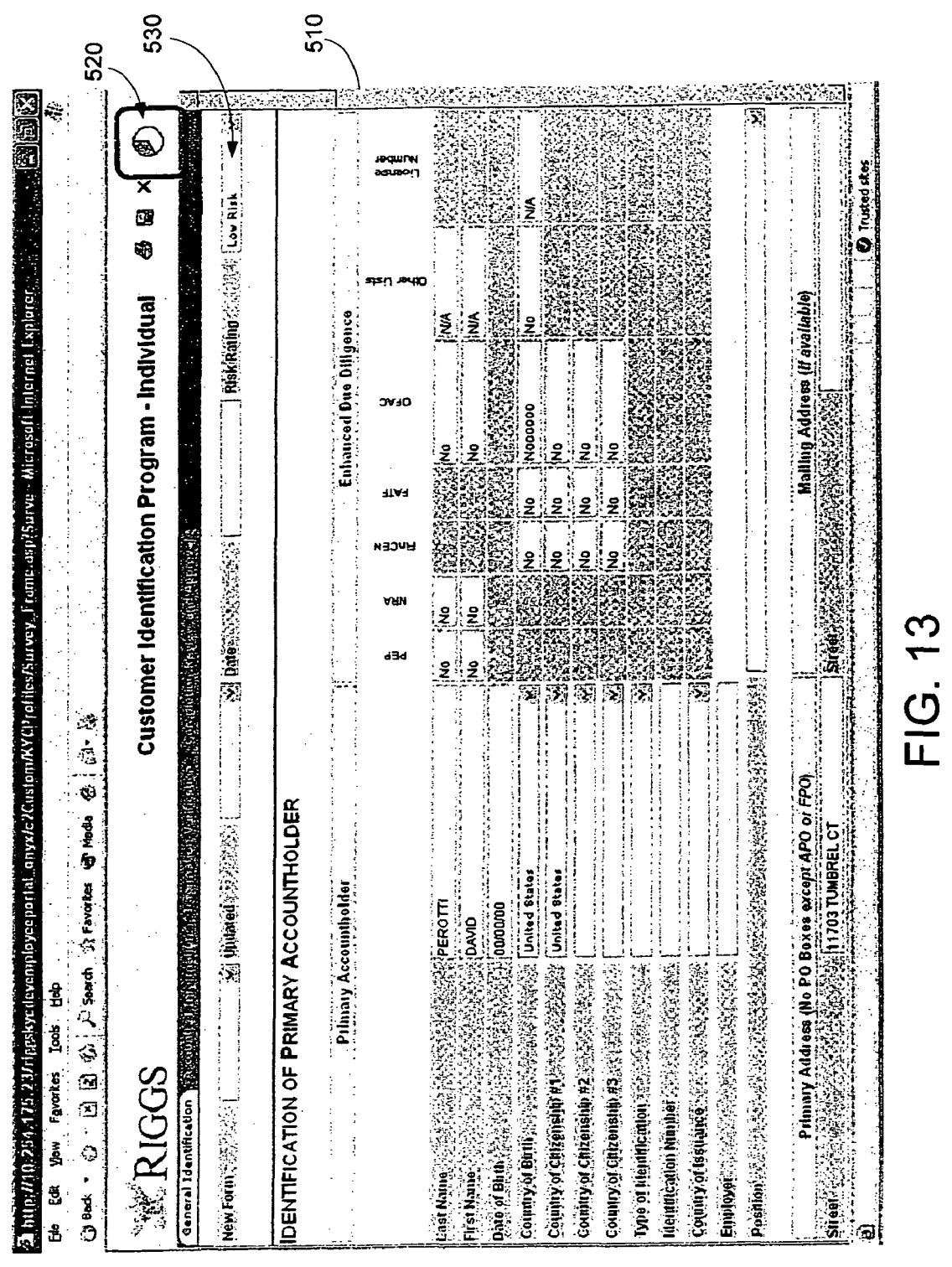

FIG. 13 shows another exemplary display screen 510, which is similar to the display screen 410 discussed above. The display screen 510 of FIG. 13, however, includes a graphical representation 520 of the current aggregate risk level for the customer in addition to a textual description 530. These representations may be established based on predetermined risk intervals established by the financial institution. The graphical risk representation 510 is illustratively shown as a pie chart, the darkened area of which represents the relative risk level associated with this customer. In the illustrated case, a darkened area constituting approximately one third of the pie is associated with a "Low Risk" as stated in the textual risk description 530. It will be understood that any convenient graphical representation may be used. Both the graphical and textual representations may be updated at any time the aggregate risk is recomputed.

Methods of the invention may be implemented through the use of software packages adapted for use with the previously discussed data processing systems. In the illustrative data processing systems 1000, 1100 of FIGS. 5 and 6, the question optimization modules 1020, 1120 may be programmed to carry out the method steps associated with updating a current question set based on expected answer and anticipated answer information stored in the data storage modules 1040, 1140. The risk determination modules 1030, 1130 may be programmed to carry out the method steps associated with calculating and recalculating individual risk contribution values associated with specific customer characteristics and/or the aggregate risk for a customer using risk calculation criteria, formulas and empirical data stored in the data storage modules 1040, 1140.

The management modules 1050, 1150 may be programmed to allow management access to the various question display criteria and risk determination criteria so that the survey tools provided by the software may be readily adapted to changing conditions or changes in regulatory criteria. The management modules 1050, 1150 can be used to tailor the appearance, sequence, and grouping of questions and/or display screens. More importantly, the management modules 1050, 1150 may be used to reconfigure the basic rules for question optimization and risk determination. The management modules 1050, 1150 may also be used by the survey or system manager to structure the interdependence of various questions in the survey and the rules for overriding these interdependencies and default answers.

The methods of the invention are highly valuable in gathering and using customer information upon initial contact with a customer. The ability to evaluate customer-associated risk at the front-end of a business relationship using a self-optimizing survey provides a unique compliance and risk assessment tool for a financial institution. The methods of the invention are not, however, confined to circumstances in which the financial institution has no prior contact with or information about a customer. In many instances, a financial institution may already have information about a particular customer from prior dealings with that customer. Such information may be available from previously stored customer information sets or otherwise available from databases accessible to the survey-conducting processing system. Also, given minimal information on a customer (e.g., name and social security number), additional customer information may be available from other public sources, such additional information being usable to answer some of the questions in the automated surveys.

Accordingly, some embodiments of the invention may provide for obtaining answers to survey questions from non-customer sources. Such sources may include any database stored in or accessible to an automated system for compiling customer information according to methods of the invention. Thus, the automated methods of the invention may include obtaining answers to survey questions from non-customer sources prior to or during the process of obtaining information from a customer. Such answers and their associated questions may be selectively displayed to a user during the course of the interactive survey. Embodiments of the invention may be adapted so that a managing authority can determine whether the answers obtained from non-customer sources may be over-ridden based on customer-provided input.

In a particular method according to an embodiment of the invention, the action of establishing a basic question set, as for example at S350 in FIG. 3, may include a determination of whether certain customer information needed for compliance is already available. Upon determining that a particular question that would otherwise be included in the basic question set may be answered using such information, that question may be left out of or removed from the basic question set. Similarly, at any time during an interactive survey, a question of the current optimized question set may be determined to be answerable from non-customer supplied information already available. Such questions may be removed from the current optimized question set. Removal of questions from either the basic question set or the optimized question set may be made discretionary to the authority responsible for managing the survey program.

General aspects of possible implementation of the inventive technology will now be described. Various method and operating system embodiments of the inventive technology are described above. It will be appreciated that the systems of the invention or portions of the systems of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As previously discussed, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It will be understood that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, It will be understood that each of the processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, It will be understood that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

It will be understood that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. For example, in the survey methods of the invention, answers to survey questions may be obtained from a another processing machine through the use of automated database searching. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A computer-implemented method of compiling a customer information set that complies with regulatory criteria in the minimum number of sequenced questions, the method comprising:
   providing an overall question set having a plurality of questions;
   determining from the overall question set a basic question set asked of all users, wherein each question of the basic question set is associated with an expected answer and wherein the basic question set comprises the minimum number of sequenced questions the answers to which would be sufficient to meet the regulatory criteria if no unexpected answers are given;
   providing predetermined sequenced criteria for supplementing the basic question set with supplemental additional questions from the overall question set within the sequence of the basic question set, wherein the criteria are structured to minimize the number of remaining questions that must be answered in order to comply with the regulatory criteria;
   conducting an optimized interactive customer survey, comprising:
      presenting each question of the basic question set to a user;
      receiving from the user an answer to each basic question;
      determining if the received answer is the expected answer for the question asked;

upon a determination that the received answer is the expected answer, continuing in the basic question set sequence to the next question in the basic question set;

upon a determination that the received answer is not the expected answer, presenting supplemental additional questions based on the predetermined sequenced criteria for supplementing the basic question set and returning to the sequence of the basic question set once the user provides the expected answer to the supplemental additional questions;

repeating the preceding steps until all basic questions and required supplemental additional questions have been asked and answered; and informing the customer of completion of the survey once the customer provides answers to the minimum number of questions needed to comply with the regulatory criteria;

wherein the preceding steps are implemented by a computer, comprising at least a computer processor.

2. A method according to claim 1, wherein the action of conducting an optimized interactive customer survey includes:

displaying to a user the at least one question of the basic question set;

receiving from the user an answer to the at least one question of the basic question set;

determining whether the received answer differs from the expected answer associated with the at least one question of the basic question set;

responsive to a determination that the answer differs from the expected answer associated with the at least one question of the basic question set, establishing an updated question set using the overall question set, the basic question set and the criteria for modifying the basic question set; and displaying to the user at least one question from the updated question set.

3. A method according to claim 1, further comprising:

constructing a customer information set using answers received during the optimized interactive customer survey; and storing the customer information set.

4. A method according to claim 1, wherein the basic question set includes a plurality of questions from the overall question set and wherein the action of conducting an optimized interactive customer survey includes:

displaying a first display question set consisting of a plurality of questions from the basic question set including at least one question having an associated expected answer;

receiving from the user an answer to the at least one question having an associated expected answer;

determining whether the received answer differs from the expected answer associated with the at least one question having an associated expected answer; and responsive to a determination that the answer differs from the expected answer, establishing an updated question set using the overall question set, the basic question set and the criteria for modifying the basic question set and displaying a second display question set consisting of a plurality of questions from the updated question set.

5. A method according to claim 1 further comprising:

associating an anticipated answer set with at least one of the plurality of supplemental additional questions, the anticipated answer set comprising at least one anticipated answer; and responsive to receiving during the optimized interactive customer survey an answer to the at least one of the plurality of supplemental additional questions that matches one of the at least one anticipated answer, determining a risk contribution factor to be associated with the received answer.

6. A method according to claim 5 wherein the risk contribution factor is determined from a predetermined risk contribution factor value associated with the at least one anticipated answer.

7. A method according to claim 6 wherein the risk contribution factor is determined based on a risk factor calculation that uses a first predetermined risk factor value, the first predetermined risk factor value being associated with the at least one anticipated answer.

8. A method according to claim 7 wherein the risk factor calculation also uses a second predetermined risk factor value, the second predetermined risk factor value being associated with a second anticipated answer that has been matched by a received answer.

9. A method according to claim 1 further comprising:

associating an anticipated answer set with at least one of the plurality of questions, the anticipated answer set comprising at least one anticipated answer; and responsive to receiving during the optimized interactive customer survey an answer to the at least one of the plurality of questions that matches one of the at least one anticipated answer, determining an aggregate risk value.

10. A method according to claim 9 wherein the risk contribution factor is determined from a predetermined risk contribution factor value associated with the at least one anticipated answer.

11. A method according to claim 10 wherein the risk contribution factor is determined based on a risk factor calculation that uses a first predetermined risk factor value, the first predetermined risk factor value being associated with the at least one anticipated answer.

12. A method according to claim 11 wherein the risk factor calculation also uses a second predetermined risk factor value, the second predetermined risk factor value being associated with a second anticipated answer that has been matched by a received answer.

13. A method according to claim 1, wherein the action of conducting an optimized interactive customer survey is carried out as part of a front-end customer identification procedure.

14. A method according to claim 1 further comprising:

determining for at least one basic question whether an answer to the at least one basic question may be determined from non-customer-supplied information; and responsive to a determination that an answer to the at least one basic question may be determined from non-customer-supplied information, removing the at least one basic question from the basic question set.

15. A computer-implemented method of compiling a customer information set that complies with regulatory criteria in the minimum number of sequenced questions, the method comprising:

displaying to a user at least one question asked of all users having an associated single expected answer, the at least one question having been selected from an overall question set comprising all possible questions for which answers may be required in order to comply with the regulatory criteria, wherein the at least one question comprises the minimum number of sequenced questions the answers to which would be sufficient to meet the regulatory criteria if no unexpected answers are given;

receiving an answer to a selected one of the at least one question, the answer being reflective of information relating to a customer;

determining whether the answer differs from the single expected answer associated with the selected question;

responsive to a determination that the answer differs from the single expected answer associated with the selected question, establishing an optimum question set of the at least one question and at least one supplemental question from the overall question set, the optimum question set having a minimum number of sequenced questions the answers to which would be sufficient to meet the regulatory criteria based on the answer to the selected question if no additional unexpected answers are given;

displaying to the user at least one question from the optimum question set, wherein the at least one supplemental question is displayed to the user within the sequence of the at least one question; and wherein the preceding steps are implemented by a computer, comprising at least a computer processor.

16. A method according to claim 15 further comprising:
receiving an answer to a selected one of the at least one question from the optimum question set;

determining whether the selected one of the at least one question from the optimum question set has an associated expected answer;

responsive to a determination that the selected one of the at least one question from the optimum question set has an expected answer, determining if the answer to the selected one of the at least one question from the optimum question set differs from the expected answer for the selected one of the at least one question from the optimum question; and responsive to a determination that the answer to a selected one of the at least one question from the optimum question set differs from the expected answer for the selected one of the at least one question from the optimum question, revising the optimum question set so that the optimum question set has a minimum number of questions required for compliance with the regulatory criteria given the answer to the selected one of the at least one question from the optimum question set.

17. A method according to claim 16 wherein the actions of claim 16 are repeated until an answer has been received for each question in the optimum question set.

18. A method according to claim 15 further comprising:
displaying to a user at least one question from the overall question set having an associated first anticipated answer;

receiving an answer to the at least one question from the overall question set having an associated first anticipated answer, the received answer being reflective of information relating to the customer;

determining whether the received answer to the at least one question from the overall question set differs from the first anticipated answer; and responsive to a determination that the received answer differs from the first anticipated answer, determining a risk contribution factor to be associated with the received answer.

19. A method according to claim 18 wherein the risk contribution factor is determined from a predetermined risk contribution factor value associated with the first anticipated answer.

20. A method according to claim 18 wherein the risk contribution factor is determined based on a risk factor calculation that uses a first predetermined risk factor value, the first predetermined risk factor value being associated with the first anticipated answer.

21. A method according to claim 20 wherein the risk factor calculation also uses a second predetermined risk factor value, the second predetermined risk factor value being associated with a second anticipated answer that has been matched by a previously received answer.

22. A method according to claim 15 further comprising:
displaying to a user at least one question from the overall question set having an associated anticipated answer;

receiving an answer to the at least one question from the overall question set having an associated anticipated answer, the answer being reflective of information relating to the customer;

determining whether the answer to the at least one question from the overall question set differs from the expected answer associated with the at least one question from the overall question set; and responsive to a determination that the received answer differs from the expected answer associated with the at least one question from the overall question set, determining an aggregate risk value for the customer.

23. A method according to claim 22 wherein the risk contribution factor is determined from a predetermined risk contribution factor value associated with the first anticipated answer.

24. A method according to claim 22 wherein the risk contribution factor is determined based on a risk factor calculation that uses a first predetermined risk factor value, the first predetermined risk factor value being associated with the first anticipated answer.

25. A method according to claim 24 wherein the risk factor calculation also uses a second predetermined risk factor value, the second predetermined risk factor value being associated with a second anticipated answer that has been matched by a previously received answer.

26. A method according to claim 15, wherein the actions of
displaying to a user at least one question having an associated expected answer,
receiving an answer to a selected one of the at least one question,
determining whether the answer differs from the expected answer,
responsive to a determination that the answer differs from the expected answer, establishing an optimum question set, and
displaying to the user at least one question from the optimum question set are carried out as part of a front-end customer identification procedure.

27. A method according to claim 15 further comprising:
determining for at least one optimum set question whether an answer to the at least one optimum set question may be determined from non-customer-supplied information; and responsive to a determination that an answer to the at least one optimum set question may be determined from non-customer-supplied information, removing the at least one optimum set question from the optimum question set.

28. A computer-implemented method of compiling a customer information set that complies with regulatory criteria in the minimum number of sequenced questions, the method comprising:
displaying to a user at least one question asked of all users and having an associated single expected answer, the at least one question having been selected from an optimum subset of an overall question pool comprising all possible questions for which answers may be required in order to comply with the regulatory criteria, the optimum subset including only an optimized set of sequenced questions, wherein the optimized set of sequenced questions comprises the minimum number of questions the answers to which would be sufficient to meet the regulatory criteria if no unexpected answers are received;

receiving an answer to a selected one of the at least one question, the answer providing information relating to a customer;

adding the information to a customer information set for the customer;

comparing the answer to the single expected answer associated with the selected question to determine if the answer is an unexpected answer;

responsive to a determination that the answer is an unexpected answer, revising the optimum subset to include supplemental questions from the overall question pool, wherein the optimized set of sequenced questions and supplemental questions comprises the minimum number of questions the answers to which would be sufficient to meet the regulatory criteria if no further unexpected answers are received;

displaying to the user at least one question from the revised optimum subset, wherein the supplemental questions are displayed to the user within the sequence of the optimum subset; and wherein the preceding steps are implemented by a computer, comprising at least a computer processor.

29. A method according to claim 28 further comprising:
receiving an answer to a selected one of the at least one question from the optimum subset;
determining whether the selected one of the at least one question from the optimum subset has an associated expected answer;
responsive to a determination that the selected one of the at least one question from the optimum subset has an expected answer, comparing the answer for the selected one of the at least one question from the optimum subset to the expected answer associated with the selected one of the at least one question from the optimum subset to determine if the answer is an unexpected answer; and
responsive to a determination that the answer to the selected one of the at least one question from the optimum subset is an unexpected answer, revising the optimum subset to include only another re-optimized set of questions, the answers to which would be sufficient to meet the regulatory criteria if no further unexpected answers are received.

30. A method according to claim 29 wherein the actions of claim 30 are repeated until an answer has been received for each question in the optimum question set.

31. A method according to claim 28 further comprising:
displaying to a user at least one question from the overall question set having an associated first anticipated answer;
receiving an answer to the at least one question from the overall question set having an associated first anticipated answer, the received answer being reflective of information relating to the customer;
determining whether the received answer to the at least one question from the overall question set differs from the first anticipated answer; and
responsive to a determination that the received answer differs from the first anticipated answer, determining a risk contribution factor to be associated with the received answer.

32. A method according to claim 31 wherein the risk contribution factor is determined from a predetermined risk contribution factor value associated with the first anticipated answer.

33. A method according to claim 31 wherein the risk contribution factor is determined based on a risk factor calculation that uses a first predetermined risk factor value, the first predetermined risk factor value being associated with the first anticipated answer.

34. A method according to claim 33 wherein the risk factor calculation also uses a second predetermined risk factor value, the second predetermined risk factor value being associated with a second anticipated answer that has been matched by a previously received answer.

35. A method according to claim 28 further comprising:
displaying to a user at least one question from the overall question set having an associated anticipated answer;
receiving an answer to the at least one question from the overall question set having an associated anticipated answer, the answer being reflective of information relating to the customer;
determining whether the answer to the at least one question from the overall question set differs from the expected answer associated with the at least one question from the overall question set; and
responsive to a determination that the received answer differs from the expected answer associated with the at least one question from the overall question set, determining an aggregate risk value for the customer.

36. A method according to claim 35 wherein the risk contribution factor is determined from a predetermined risk contribution factor value associated with the first anticipated answer.

37. A method according to claim 35 wherein the risk contribution factor is determined based on a risk factor calculation that uses a first predetermined risk factor value, the first predetermined risk factor value being associated with the first anticipated answer.

38. A method according to claim 37 wherein the risk factor calculation also uses a second predetermined risk factor value, the second predetermined risk factor value being associated with a second anticipated answer that has been matched by a previously received answer.

* * * * *